Dec. 24, 1974 V. P. ALEKS Re. 28, 280

HANDLE LATCH AND LABEL HOLDER

Original Filed July 26, 1968 2 Sheets-Sheet 1

Inventor
Vytautas P. Aleks
by: Wilson & Hopper
Atty's

HANDLE LATCH AND LABEL HOLDER

Original Filed July 26, 1968 2 Sheets-Sheet 2

Inventor
Vytart P. Aleks
by Wilson & Geppert
Atty's

United States Patent Office

Re. 28,280
Reissued Dec. 24, 1974

28,280

HANDLE LATCH AND LABEL HOLDER

Vytant P. Aleks, Rockford, Ill., assignor to Keystone Consolidated Industries, Inc., Rockford, Ill.

Original No. 3,549,228, dated Dec. 22, 1970, Ser. No. 748,083, July 26, 1968. Application for reissue Dec. 7, 1972, Ser. No. 313,092
Int. Cl. A47b *88/00*
U.S. Cl. 312—320 4 Claims

Matter enclosed in heavy brackets [ ] appears in the original patent but forms no part of this reissue specification; matter printed in italics indicates the additions made by reissue.

ABSTRACT OF THE DISCLOSURE

A filing cabinet handle latch and label holder that is received within the hollow front wall of a file drawer and latches the drawer within the filing cambinet. The handle is mounted within a complementary opening in the front wall of the file drawer and has an opening therethrough to receive a transparent label holder therein. A finger bar extends across and through the handle, is pivotally mounted at one side of the handle and extends beyond the opposite side of the handle to adjacent the side of the drawer front wall; the opposite side of the handle having an opening therein to allow vertical oscillation of the finger bar about the pivot. A depending latching bar having a latching hook on the lower end is secured to the finger bar for vertical movement.

The present invention relates to a combined handle latch and label holder, and more particularly to a handle latch for a filing cabinet drawer to latch the drawer in the filing cabinet, and a label holder is mounted within the handle to receive and show an appropriate label for the drawer.

Among the objects of the present invention is the provision of a handle latch for a filing cabinet drawer for latching the drawer in the filing cabinet. The handle is received in a complementary opening in the front wall of a file drawer and has a forwardly and downwardly inclined lip or edge adapted to be gripped to withdraw the drawer. The front wall of the file drawer is hollow and includes a depending latching bar with a rearwardly extending latching hook adapted to engage an edge of an opening in a strike or wall of the filing cabinet; the hook having a camming edge to cam the hook upward as the file drawer is closed. A finger bar is mounted in the handle and actuates the latching bar.

Another object of the present application is the provision of a handle latch having a handle received in an opening of the file drawer, a depending latching bar, and a finger bar secured at one end to the latching bar and at the other end pivotally mounted in the handle. The handle is generally rectangular and has opposite end walls with the end wall farthest from the latching bar provided with a slot and the opposite end wall provided with an opening. The finger bar is slotted at one end to engage the slot in the handle end wall and provide a pivot for the bar, and the finger bar extends across the handle and through and beyond the opening in the opposite end wall to engage the upper end of the depending latch bar.

A further object of the present invention is the provision of a handle and label holder where the handle is received in a complementary opening in the front wall of the file drawer and the handle is provided with an open rear wall. A label holder formed of a transparent plastic has a flat base and a pair of parallel rearwardly inclined walls extending upward from the front edge of the base and diverging at the upper ends thereof. A label can be inserted into the space between the inclined walls through the opening in the rear surface of the front file drawer wall.

Further objects are to provide a construction of maximum simplicity, efficiency, economy and ease of assembly and operation, and such further objects, advantages and capabilities as will later more fully appear and are inherently possessed thereby.

Figure 1:
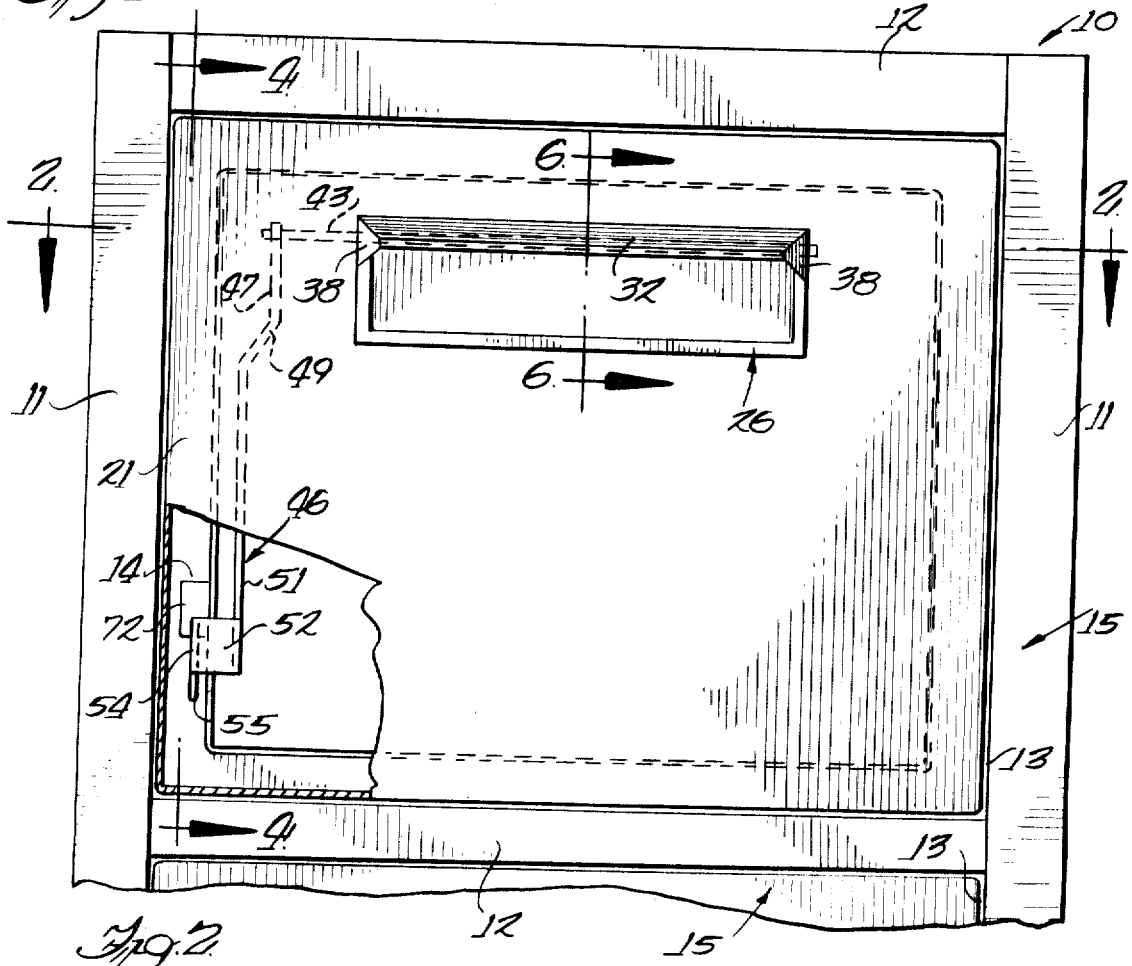
FIG. 1 is a front elevational view of a file cabinet and file drawer having a handle latch and label holder of the present invention.

Referring more particularly to the disclosure in the drawings wherein is shown an illustrative embodiment of the present invention, FIG. 1 discloses a file cabinet 10 having two or more file drawers 15 therein; the file cabinet and file drawers preferably being formed of sheet metal construction. The file cabinet includes hollow side walls 11 and intermediate horizontal connecting partitions 12 defining openings 13 for the file drawers. In each opening 13 from a side wall 11 is a strike or flange 14 extending inwardly a short distance into the opening.

Each file drawer 15 includes a front wall 16 formed of a front panel 17 and a back panel 18 of slightly smaller dimensions than the front panel; the two panels forming a hollow interior 19. The front panel being of larger dimensions provides a hollow flange 21 that conformably fits within the opening 13 in the file cabinet 10. The panels 17 and 18 have overlapping flanges 22 and are secured together by a plurality of suitable securing means, such as the screws 23 extending through the overlapping flanges. The front panel 17 has an opening 24 therein centrally located but offset above the horizontal center line of the drawer 15, and a rearward opening 25 is located in the flange 21 at the left side, as seen in FIG. 1 and near the lower edge of the wall.

Figure 5:
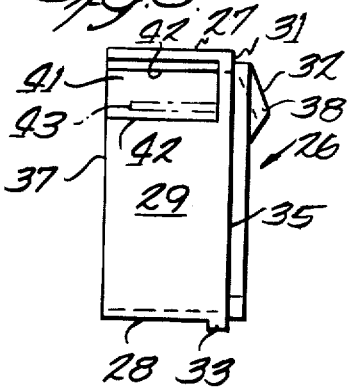
FIG. 5 is an end elevational view of the handle taken from the left hand end thereof as seen in FIG. 1.

The opening 24 in the front panel 17 conformably receives a handle 26 formed as a hollow generally rectangular member having a top wall 27, a bottom wall 28 and side walls 29 and 30. The top wall is provided with a shoulder 31 and a forwardly and downwardly inclined lip or edge 32 (FIGS. 5 and 6) providing a gripping member or surface for the user. The bottom wall is provided with a downwardly extending flange 33 and an upwardly extending front lip 34 (FIG. 6) while the side walls have shoulders 35 which are continuations of the shoulder 31; the shoulders 31, 35 and the flange 33 providing retaining surfaces abutting the interior surface 36 of the edge of the opening 24. The rear edges 37 of the handle abut the interior surface of the back panel 18, and the inclined lip 32 is formed with inwardly inclined side walls 38.

Figure 2:
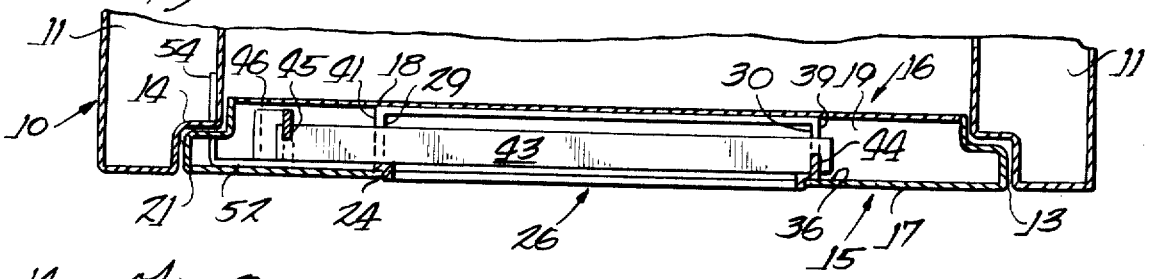
FIG. 2 is a horizontal cross sectional view taken on the line 2—2 of FIG. 1.
Figure 3:
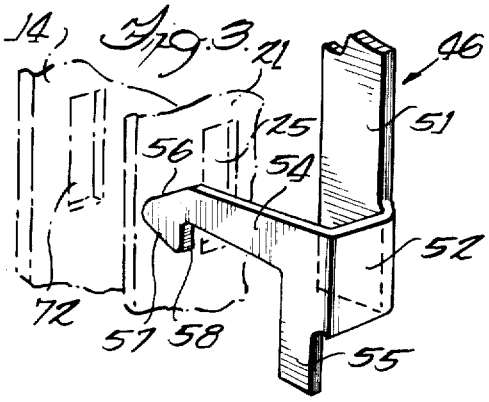
FIG. 3 is a partial perspective view of the latching hook.
Figure 4:
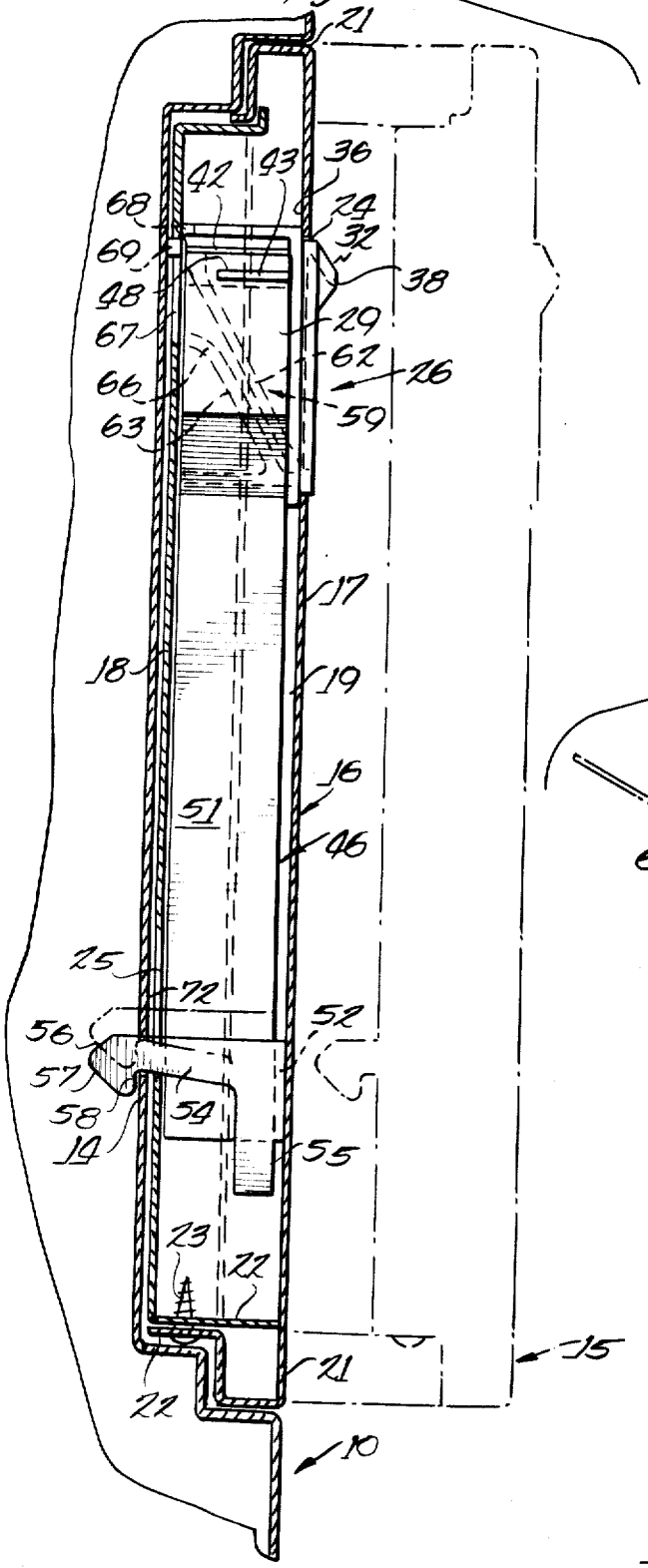
FIG. 4 is a vertical cross sectional view taken on the line 4—4 of FIG. 1.

The right hand side wall 30, as seen in FIGS. 1 and 2, is provided with a narrow slot 39 opening at the rear edge 37 (FIG. 6), while the left-hand side wall 29 is provided with an opening 41 (FIG. 5) having generally parallel edges 42 opening at the rear edge 37 of the wall. An elongated finger bar 43 has one end slotted at 44 to engage the slot 39 in the side wall 30 and provide a pivot axis for the bar. The bar extends across the handle, generally hidden behind the inclined lip 32, and through and beyond the opening 41 in the side wall 29 to terminate in a slot 45 opening in the opposite direction to the slot 44. The opening 41 in the side wall 29 allows vertical movement of the finger bar 43 about the pivot point established at the side wall 30.

A depending latching bar 46 has a slot 48 at the upper end 47 which interengages with the slot 45 in the finger bar 43, an inclined outwardly offset portion 49, and a depending portion 51 of a width to be received between the front and back panels 17 and 18. At the lower end, the bar 46 has a laterally extending flange 52 which extends into the hollow flange 21 of the front panel 17. The flange 52 terminates in a rearwardly extending latching hook 54 having a depending guide lug 55 adjacent the flange 52. The latching hook 54 includes camming edges 56 and 57 and an undercut portion 58 adapted to engage the strike or flange 14 in the cabinet 10. The latching hook 54 extends rearwardly through the opening 25 in the flange 21 which allows vertical reciprocation of the latching bar 46 upon lifting of the finger bar 43.

Figure 6:
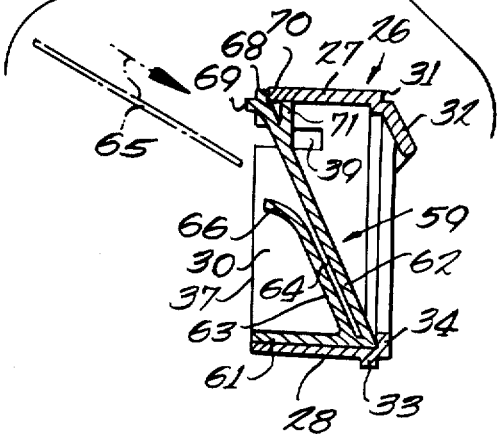
FIG. 6 is a vertical cross sectional view of the handle and label holder taken on the line 6—6 of FIG. 1.

The handle 26 also houses a label holder 59 formed of a suitable transparent plastic material, such as polystyrene. The label holder 59 includes a base portion 61 conformably received in and engaging the bottom wall 28 and the front lip 34 of the handle 26, and a pair of upwardly and rearwardly inclined spaced generally parallel walls 62 and 63 forming a space 64 therebetween to receive a label 65 (FIG. 6). The lower wall 63 diverges away from the wall 62 at 66 to abut the back panel 18 at the lower edge of an opening 67 therein.

The upper wall 62 extends upwardly to terminate in a pair of right-angle flanges 68 and 69, the flange 68 extending into a slot 70 formed in the rear edge of the top handle wall 27 and the flange 69 extending rearwardly to abut the upper edge of the back panel opening 67. Also a second vertical flange 71 is located parallel to and forwardly of the flange 68 and abuts the interior surface of the top handle wall 27. As clearly seen in FIG. 6, a label 65 can be inserted into the label holder 59 through the opening 67 in the back panel 18 and enters the space 64 between the inclined walls 62 and 63 to be visible through the open front of the handle 26.

When the drawer 15 is closed in the file cabinet 10, the undercut portion 58 of the latching hook 54 engages the edge of opening 72 in the strike or flange 14 for the cabinet 10. To open the drawer 15, the user inserts his finger tips into the open front of the handle 26 to engage and lift the finger bar 43. Lifting the finger bar about the pivotal axis at the side wall 30 causes vertical upward movement of the latching bar 46 to lift and disengage the latching hook 54 from the strike or flange 14. In lifting the finger bar 43, the finger tips engage the underside of the inclined lip 32 to manually pull the file drawer 15 outwardly. When the drawer 15 is to be closed, the drawer is pushed inwardly with the camming edge 57 of the latching hook 54 engaging the strike 14 to lift the latching hook 54 to pass over the upper edge of the strike until the drawer is completely closed and the undercut portion 58 drops over the strike 14 to latch the drawer in closed position.

Having thus disclosed my invention I claim:

[1. A handle latch for a file cabinet drawer having a drawer front including a front panel and a back panel defining a hollow interior space therebetween and said front panel having an opening therein, comprising a handle positioned in the opening in the drawer front panel and in the hollow space extending to the back panel, said handle having an open front defined by an inwardly extending top and bottom wall and integral inwardly extending opposite end walls forming an enclosure, a downwardly inclined gripping lip integral with said top wall, an elongated finger bar extending across and through the handle and positioned behind said inclined gripping lip, said finger bar being pivotally mounted at one end in said handle and having the opposite end extending beyond said handle into said hollow space, one end wall having a slot therein receiving the end of the finger bar for pivotal movement, said end of the finger bar having a slot interengaging with the slot in the handle to provide a pivotal axis for the finger bar, the opposite end wall of the handle having an opening therein receiving the finger bar and allowing limited vertical movement thereof, and a depending latching bar positioned in said hollow space offset from said handle and connected at its upper end to said opposite end of the finger bar, said latching bar having a rearwardly extending latching hook adapted to engage a strike in the file cabinet housing the drawer, said drawer front having a rear opening receiving the latching hook.]

[2. A handle latch as set forth in claim 1, in which said latching hook terminates in a camming edge and an undercut latching edge, and a depending guide on said latching hook spaced from said undercut edge and received within said hollow space to guide the vertical movement of said latching bar.]

[3. A handle latch as set forth in claim 1, in which said inclined gripping lip extends downwardly and outwardly from the top wall of the handle to partially cover the upper edge of the open front of the handle.]

4. A handle and label holder for a file cabinet drawer having a drawer front including a front panel having an opening therein and a back panel having an opening therein, said front and back panels defining a hollow space therebetween, comprising a hollow handle including an open front defined by a top wall, a bottom wall and integral opposite end walls forming an enclosure received in the opening in the front panel and extending rearwardly to the back panel, and an upwardly extending front lip formed at the front edge of the botom wall, and a label holder including a base conformably received on said handle bottom wall and abutting the upwardly extending lip, and a pair of generally parallel upwardly and rearwardly inclined spaced walls integral with and intersecting the font edge of the base and adapted to receive a label therebetween, said label holder being formed of a generally transparent material, such as a transparent plastic.

5. A handle and label holder as set forth in claim 4, in which the front inclined wall extends upwardly to terminate in a rearwardly extending flange adapted to abut said back panel, and a pair of parallel upwardly extending positioning flanges abutting the handle top wall, and said rear inclined wall diverges away from said front inclined wall and terminates in an edge adjacent to and adapted to abut said back panel to define an opening to receive and guide a label inserted into the holder.

6. A handle and label holder as set forth in claim 5, in which the top wall of said handle has an elongated slot at the rear edge thereof to receive one of the upwardly extending flanges on the front inclined wall and the other flange abuts the top wall forwardly of the slot.

7. A handle and label holder as set forth in claim 5, in which said rearwardly extending flange on the front inclined wall and the rear edge on the rear inclined wall are generally aligned with the upper and lower edges defining the opening in the back panel to define the vertical limits of the opening receiving a label, and an inclined gripping lip integral with and extending forwardly and downwardly from said handle top wall.

References Cited

The following references cited by the Examiner, are of record in the patented file of this patent or the original patent.

UNITED STATES PATENTS

| | | | |
|---|---|---|---|
| 2,556,821 | 6/1951 | Rameson | 292—126 |
| 2,676,866 | 4/1954 | Woodin | 312—333 |
| 3,252,746 | 5/1966 | Kafferlin et al. | 312—333 |
| 3,238,656 | 3/1966 | Kanzelberger | 312—234.4 |
| 1,934,397 | 11/1933 | Bales et al. | 312—333 |
| 3,122,402 | 2/1964 | Bullock et al. | 312—333 |

| | | | |
|---|---|---|---|
| 3,218,112 | 11/1965 | Stark | 312—333 |
| 3,292,985 | 12/1966 | Buhrmaster | 312—333 X |
| 2,689,777 | 9/1954 | Wolters | 312—333 |
| 3,239,298 | 3/1966 | McCarthy | 312—333 R |
| 3,098,686 | 7/1963 | Benoit | 16—124 X |
| 1,569,094 | 1/1926 | Kurtzon | 312—320 |
| 1,968,829 | 8/1934 | Harrington | 312—320 |
| 3,031,248 | 4/1962 | Jeeves | 312—320 |

JAMES T. McCALL, Primary Examiner

U.S. Cl. X.R.

312—330, 333